United States Patent [19]

Hata

[11] Patent Number: 4,804,816

[45] Date of Patent: Feb. 14, 1989

[54] METHOD OF MAKING A THIN-FILM MAGNETIC HEAD HAVING A MULTI-LAYERED COIL STRUCTURE

[75] Inventor: Hidekazu Hata, Tokyo, Japan

[73] Assignee: Kabushiki Kaisha Kenwood, Tokyo, Japan

[21] Appl. No.: 165,076

[22] Filed: Mar. 7, 1988

Related U.S. Application Data

[63] Continuation of Ser. No. 833,425, Feb. 24, 1986, abandoned, which is a continuation of Ser. No. 449,256, Dec. 13, 1982, abandoned.

[30] Foreign Application Priority Data

Dec. 21, 1981 [JP] Japan ................... 56-205263

[51] Int. Cl.⁴ .................. B23K 9/00; G11B 5/127; G11B 5/147; H01F 7/06
[52] U.S. Cl. .................. 219/121.2; 360/110; 360/126; 360/125; 29/603; 204/192.34
[58] Field of Search ......... 29/603; 360/125, 126–129, 360/122, 110, 103; 156/625, 646, 648, 643; 219/121 PG, 121 PF, 121 EJ, 121 EK; 204/192.34, 192.35, 192.37

[56] References Cited

U.S. PATENT DOCUMENTS

| 4,281,357 | 7/1981 | Lee ........................ 360/125 |
| 4,489,357 | 12/1984 | Van Doijen et al. ............ 360/119 |

FOREIGN PATENT DOCUMENTS

| 55-4762(A) | 1/1980 | Japan ................... 360/126 |
| 55-12530(A) | 1/1980 | Japan ................... 360/126 |
| 55-4734(A) | 1/1980 | Japan ................... 360/126 |
| 56-61018(A) | 5/1981 | Japan ................... 360/119 |
| 56-145514(A) | 11/1981 | Japan ................... 360/113 |
| 56-137514(A) | 11/1981 | Japan ................... 360/110 |

OTHER PUBLICATIONS

IEEE Trans. on Magnetics, vol. Mag-15, No. 3, May 1979, pp. 1060–1064, "Narrow Track Mag. Head Fab. by Ion-Etching Method" by Nakanishi et al.
IEEE Trans. on Magnetics, vol. Mag-15, No. 6, Nov. 1979, pp. 1616–1618, "Fabrication of 8 Turn Multi-Track Thin Films Heads" by Hanazono et al.
IEEE Trans. Magnetics, vol. Mag. 15, No. 6, Nov. 1979, pp. 1637–1639, "Mag. Head Fab. by Improved Ion Etching Method" by Toshima et al.
IEEE Trans. on Magnetics, vol. Mag.-15, No. 6, Nov. 1979, pp. 1648–1650, "Toward a Single-Mask Processing of Ion-Implanted Bubble Devices" by Ahn et al.
IEEE Transactions on Magnetics, vol. Mag. 16, No. 5, Sep. 1980, pp. 785–787, "Floating Thin Film Head Fabrication by Ion Etching Method" by Nakanishi et al.
National Technical Report vol. 26, No. 6, Dec. 1980, pp. 949–956, "Thin Film Magnetic Heads for Digital Audio Tape Recorder" by Nomura et al.

Primary Examiner—Stuart N. Hecker
Assistant Examiner—Alfonso Garcia
Attorney, Agent, or Firm—Gerald J. Ferguson, Jr.

[57] ABSTRACT

A method of making a thin-film magnetic head having a multi-turn structure includes forming a lower magnetic layer on a substrate, and successively forming a first insulating layer and a first conductive layer over the lower magnetic layer. Then, a first coil patterned mask is formed on the first conductive layer, and an ion beam is applied onto a structure formed by the foregoing steps. The ion beam simultaneously etches the first insulating layer and first conductive layer so that a first coil patterned double-layer is formed. Then, a second insulating layer is formed followed by an upper magnetic layer, over the first coil patterned double-layer. Thus, a magnetic gap is formed between the lower and upper magnetic layers defined by the thickness of the second insulating layer.

6 Claims, 3 Drawing Sheets

METHOD OF MAKING A THIN-FILM MAGNETIC HEAD HAVING A MULTI-LAYERED COIL STRUCTURE

This application is a continuation of Ser. No. 833,425, filed Feb. 24, 1986, now abandoned, which is a continuation of Ser. No. 449,256, filed Dec. 13, 1982, now abandoned.

BACKGROUND OF THE INVENTION

1. Field of the Invention

The present invention relates to a thin-film magnetic head for use in a magnetic recording machine, a magnetic disc apparatus and the like.

2. Description of the Prior Art

In order to achieve recording and readout of high-density information, a multi-turn coil structure is being required for thin-film magnetic head, combined with a satisfactory insulation between conductor layers and a small gap width. These two requirements are however mutually contradictory, since a satisfactory insulation between the conductor layers necessitates a certain thickness in the insulating layer while a small gap width requires an insulating layer as thin as possible.

Also the gap depth has to be exactly controlled in relation to the magnetic flux density in the gap.

SUMMARY OF THE INVENTION

In consideration of the foregoing, the object of the present invention is to provide a thin-film magnetic head capable of maintaining a sufficiently high insulation between the conductor layers and reducing the gap width, while allowing easy control of the gap depth and realizing a satisfactory head efficiency.

The above-mentioned object can be achieved according to the present invention by a thin-film magnetic head with a multi-layered multi-turn coil structure composed in succession of a lower magnetic thin film formed on a substrate, a laminated coil consisting of at least a lower conductor layer and an upper conductor layer and an upper magnetic film formed thereon, wherein the lower conductor layer and an insulating layer thereunder constitue a first trapezoid in cross section placed on the lower magnetic thin film while an insulating layer under the upper conductor layer forms a second trapezoid, and the upper conductor layer forms a third trapezoid in cross section placed on said second trapezoid, and wherein an insulating layer on the upper conductor layer alone is extended to an end face of the gap portion thereby constituting the magnetic gap.

Other objects, features and advantages of the present invention will become fully apparent in consideration of the following detailed description and from the attached drawings.

DETAILED DESCRIPTION OF THE PREFERRED EMBODIMENTS

Figure 1:
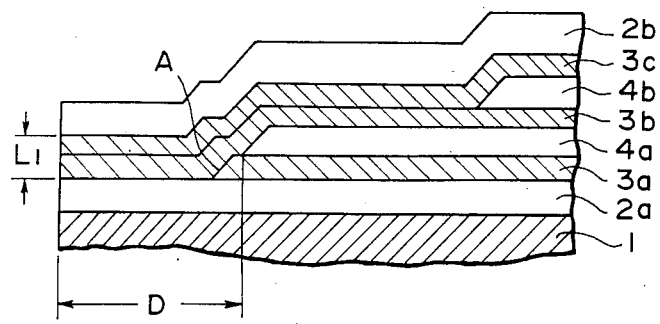
FIGS. 1 and 2 are cross-sectional views showing the main portion of conventional thin-film magnetic heads.

Referring to FIG. 1, a conventional thin-film magnetic head is prepared by forming a lower magnetic thin film 2a composed for example of permalloy on a substrate 1, then forming and etching a first insulating layer 3a thereon, forming a lower conductor layer 4a in a desired area on said first insulating layer 3a for example by etching, further forming a second insulating layer 3b, forming an upper conductor layer 4b in desired areas on said second insulating layer 3b, further forming a third insulating layer 3c on said upper conductor layer 4b and said second insulating layer 3b, and finally forming an upper magnetic thin film 2b.

In the thin-film magnetic head shown in FIG. 1, the gap width L1 is determined by the sum of thicknesses of the second and third insulating layers 3b, 3c, which have to be made thinner in order to reduce the gap width L1, but such thinner insulating layers deteriorate the insulating ability. Also the tapered portion of the upper magnetic thin film 2b shows shoulder-like profiles corresponding to the end positions of the lower and upper conductor layers 4a, 4b facing the gap, thus deteriorating the magnetic properties and reducing the efficiency of the magnetic head. Also the end position A, facing the gap, of the first insulating layer 3a has to be controlled exactly since the gap depth D is defined as the distance from the gap end to the front end of the conductor layer. For this reason a precise mask positioning is required at the manufacture.

Figure 2:
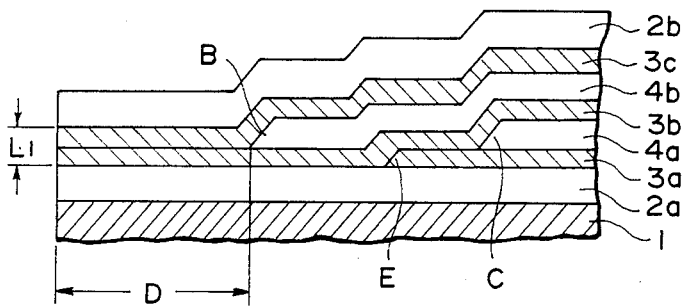

Another conventional thin-film magnetic head shown in FIG. 2 is different from the head shown in FIG. 1 in tht the end B, facing the gap, of the upper conductor layer 4b is positioned closer to the gap end than the end C, facing the gap, of the lower conductor layer 4a, and that the end E, facing the gap, of the first insulating layer 3a is positioned between the corresponding end C of the lower conductor layer 4a and the corresponding end B of the upper conductor layer 4b.

In such case the formation of the first insulating layer 3a has a larger dimensional tolerance and does not require a highly precise mask positioning since the gap depth D is defined as the distance from the gap end to the end B, facing the gap, of the upper conductor layer 4b, but it is still difficult to reduce the gap width L1 as it is equal to the sum of thicknesses of the second and third insulating layers 3b, 3c in the same manner as already explained in FIG. 1. Also the drawback of deteriorated head efficiency due to the shoulder-like profile in the tapered portion of the upper magnetic thin film 2b occurs in the same manner as in the magnetic head shown in FIG. 1.

Figure 3:
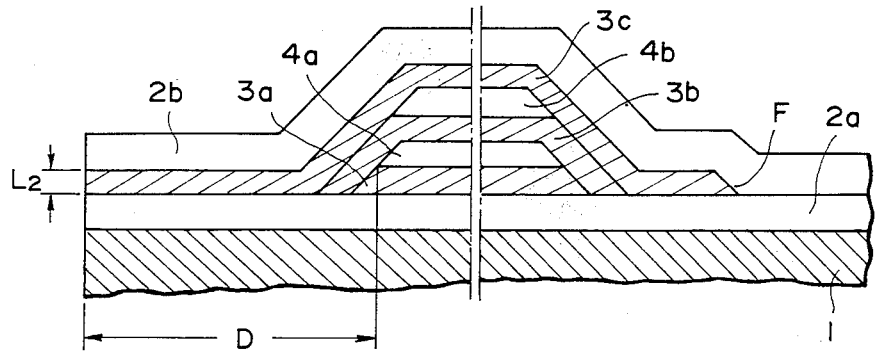
FIG. 3 is a cross-sectional view showing the main portion of thin-film magnetic head embodying the present invention.
Figure 8:
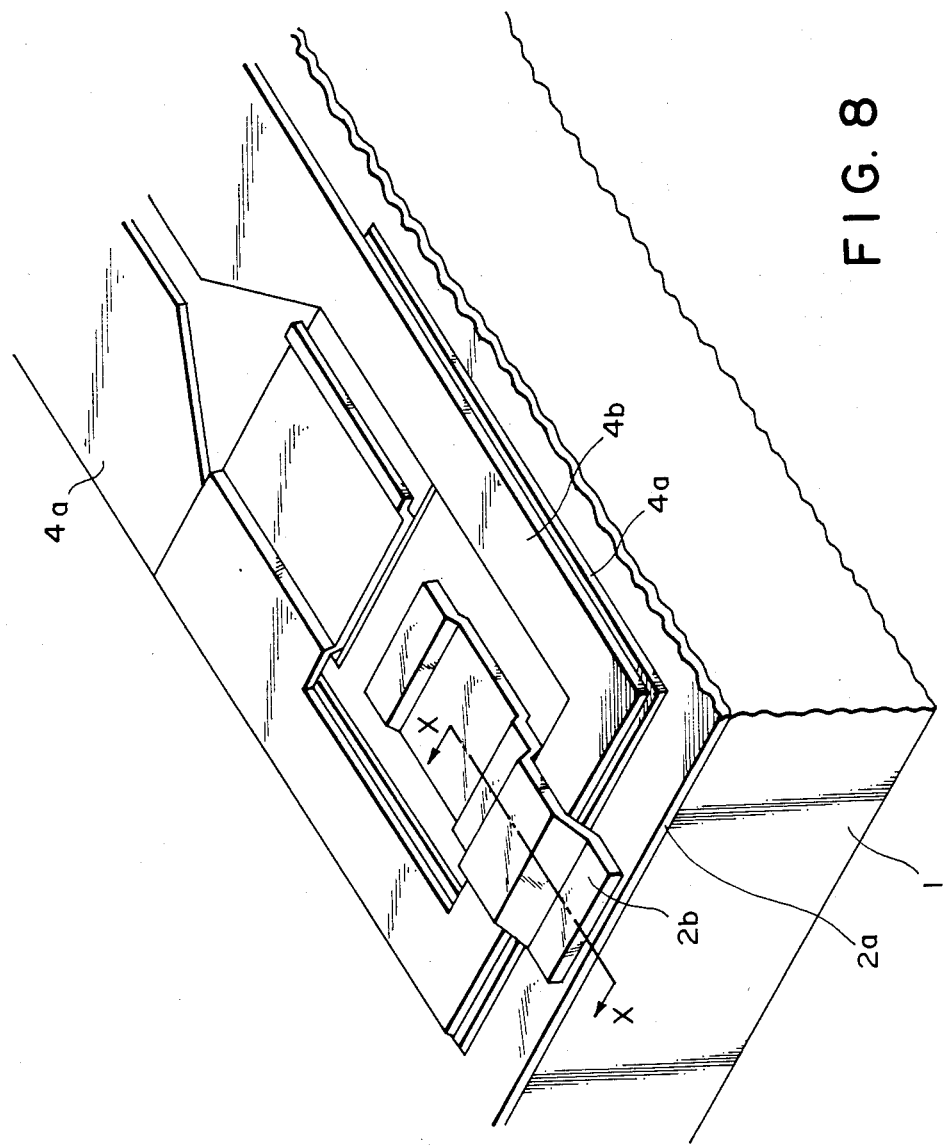
FIG. 8 is a perspective view of the thin-film magnetic head of FIG. 3. The cross-sectional view of FIG. 3 is taken along X—X' of FIG. 8.

Now reference is made to FIG. 3 showing an embodiment of the thin-film magnetic head of the present invention. The thin-film magnetic head of FIG. 3 is perspectively depicted in FIG. 8, wherein for the purpose of avoiding the complexity the insulating layers are omitted. The cross-sectional view of FIG. 3 is taken along X—X' in FIG. 8.

In this embodiment a substrate 1 is provided thereon, in a determined area, with a lower magnetic thin film 2a, at the end of which positioned at left in the drawing the gap of the magnetic head is defined. In a determined position on said lower magnetic thin film 2a, there is formed a first trapezoidal structure composed of a first insulating layer 3a and a lower conductor layer 4a. A second insulating layer 3b is formed on said first trapezoidal structure in such a manner as to cover said structure alone and to constitute a bridge-shaped second trapezoidal structure. Second insulating layer 3b connects with the first insulating layer 3a at the ends thereof, thereby entirely enclosing and electrically insulating the lower conductor layer 4a. An upper conductor layer 4b is formed on the second insulating layer 3b in such a manner as to form a third trapezoidal structure of which lower bottom is equal to the upper bottom of said second trapezoidal structure. A third insulating layer 3c is formed on said second trapezoid and said third trapezoid composed of the upper conductor layer 4b so as to entirely cover said second and third trapezoids. The third insulating layer 3c touches the second insulating layer 3b on the side faces of the second trapezoid, thereby entirely enclosing and electrically insulting the second conductor layer 4b.

Different from the first and second insulating layers, the third insulating layer is extended at the left-hand side on the lower magnetic thin film 2a to the gap end, but is extended at the right-hand side only to a determined position F on the lower magnetic thin film. An upper magnetic thin film 2b, formed on the third insulating layer 3c, is extended at the left-hand side to the gap end and at the right-hand side to a position beyond the right-hand end F of the third insulating layer 3c. The upper and lower magnetic thin films 2b, 2a mutually contact and are magnetically coupled in an area positioned right to said point F, and are maintained, in the gap portion, in mutually facing relationship across the third insulating layer 3c. In this embodiment, as explained in the foregoing, the upper and lower magnetic thin films only by the third insulating layer 3c, and the upper and lower conductor layers 4b, 4a constitute a two-layered coil.

Consequently, in this embodiment, the gap width L2 is solely determined by the thickness of the third insulating layer 3c and is equal to half the gap width in the conventional heads shown in FIGS. 1 and 2, if the thicknesses of the first to third insulating layers 3a–3c remain constant. It is therefore rendered possible to reduce the gap width, while maintaining sufficient insulating between the lower and upper conductor layers 4a, 4b, between the lower magnetic thin film 2a and the lower conductor layer 4a, and between the upper magnetic thin film 2b and the upper conductor layer 4b. Also the head efficiency is improved because of the absence of shoulder-like profile in the tapered portion of the upper magnetic thin film 2b.

Furthermore the gap depth is easily controllable, because the end position of the lower or upper conductor layer 4a or 4b, closer to the gap, can be easily determined by an appropriate selection of the tapering of the first and second trapezoids facing the gap.

Now there will be given an explanation on the method of preparation of the thin-film magnetic head shown in FIG. 3.

Figure 4:
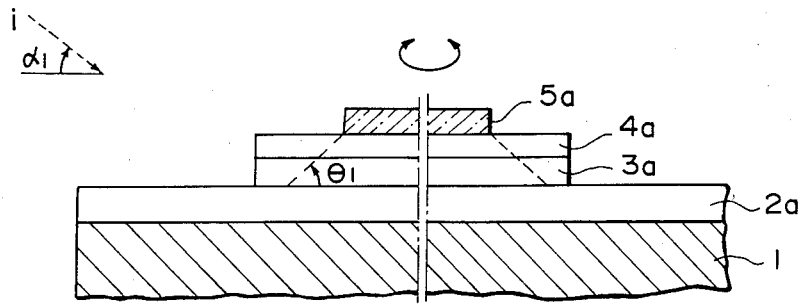
FIG. 4–FIG. 7 illustrate half-way products in a process for fabricating the thin-film magnetic head of FIG. 3.
Figure 5:
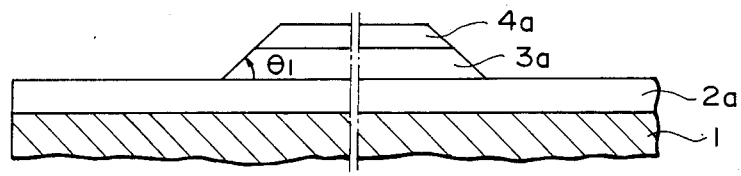

At first the lower magnetic thin film 2a composed for example of permalloy is formed on the substrate 1, and the first insulating layer 3a composed of SiO$_2$ is formed in a necessary area on said magnetic thin film 2a. Subsequently, on said first insulating layer 3a there is formed the lower conductor layer 4a composed of aluminum, on which a desired pattern is formed with a resist material 5a. The substrate 1, lower magnetic thin film 2a, first insulating layer 3a, lower conductor layer 4a and resist material 5a formed in the above-mentioned manner as shown in FIG. 4 are subjected, under rotation about an axis perpendicular to the substrate surface, to ion beam etching with an ion beam i of an incident angle $\alpha_1$ in a range of 40° to 45°. The etching speed with said ion beam i is approximately the same for aluminum and SiO$_2$ but is much lower, about $\frac{1}{3}$, for the permalloy thin film. Also the etching speed for the resist material 5a composed of a quinodiazide positive resist is about half, as compared to the etching speed for aluminum and SiO$_2$. Under the effect of the ion beam i, the first insulating layer 3a and the lower conductor layer 4a are etched to the broken lines, thus forming the first trapezoidal structure shown in FIG. 5. An excessive etching can be prevented since the lower magnetic thin film 2a is little etched because of the lower etching speed thereof, by the time the first insulating layer 3a and the lower conductor layer 4a are etched to the desired extent. Also the resist material 5a is completely removed by the completion of etching process so that the washing and other additional steps can be dispensed with if the thickness of said resist material 5a is selected approximately equal to that of the first insulating layer 3a or the lower conductor layer 4a. The angle $\theta_1$ of the first trapezoid is determined by the incident angle $\alpha_1$ of the ion beam.

Figure 6:
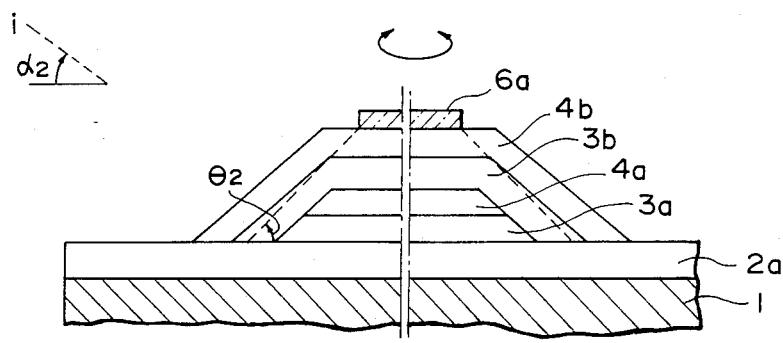
Figure 7:
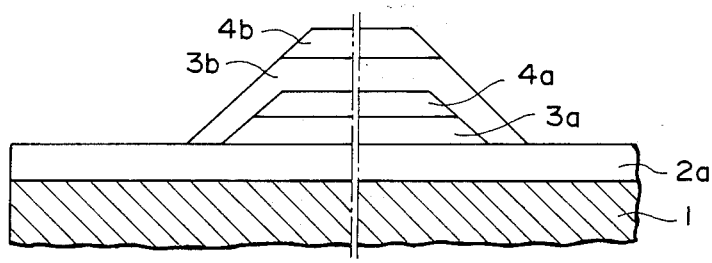

Subsequently the second insulating layer 3b and the upper conductor layer 4b are formed in succession, as shown in FIG. 6, on the lower conductor layer 4a formed into the first trapezoid. A pattern is then formed on said upper conductor layer 4b with a resist material 6a, and ion beam etching under rotation is again conducted with the ion beam i. In this etching the incident angle $\alpha_2$ of the ion beam is selected equal to or different from the aforementioned incident angle $\alpha_1$ in such a manner that the angles $\theta_1$, $\theta_2$ of the first and second trapezoids after etching satisfy a relation $\theta_1 \approx \theta_2$ or $\theta_2 > \theta_1$ so that the second insulating layer 3b alone exists on the sloping face of the first trapezoid. The formation of the second insulating layer 3b alone on said sloping face of the first trapezoid can also be achieved by an adjustment in the thickness of the resist material 6a instead of a change in the incident angle $\alpha_1$ of the ion beam i. FIG. 7 shows the shape after second ion beam etching.

Subsequently, as shown in FIG. 3 the third insulating layer 3c and the upper magnetic thin film 2b are formed in succession on the unit composed of the substrate 1, lower magnetic thin film 2a, first and second insulating layers 3a, 3b, and lower and upper conductor layers 4a, 4b as shown in FIG. 7.

The thin-film magnetic head of the present invention shown in FIG. 3 can be completed in this manner.

In this structure the gap depth D is defined by the distance between the gap end and the gap-side end of the lower conductor layer 4a in case of $\theta_1 = \theta_2$, whereas in case of $\theta_2 > \theta_1$ said gap depth is usually defined by the distance between the gap end and the gap-side end of the upper conductor layer 4b although it depends on the thicknesses of the first and second insulating layers 3a, 3b and lower conductor layer.

As explained in the foregoing, the present invention permits to reduce the gap length and allows easy control of the gap depth, without the use of thinner insulating layers and without deterioration in the head efficiency.

I claim:

1. A method of fabricating a laminated coil for a thin-film magnetic head comprising the steps of:
   forming a laminate of a lower magnetic layer, first insulating layer and first conductive layer on a substrate;
   forming a first coil patterned mask on said first conductive layer of the laminate;
   applying a first ion beam onto a structure formed by the first two steps to simultaneously etch said first insulating layer and said first conductive layer;
   successively forming a second insulating layer and a second conductive layer over said etched structure;
   forming a second coil patterned mask on said second conductive layer, the second coil patterned mask being aligned with said first coil patterned mask; and
   applying a second ion beam onto a structure formed by the above steps to simultaneously etch said second insulating layer and said conductive layer; wherein said first and second ion beams are respectively applied at respective indicent angles of $\alpha_1$, and $\alpha_2$, where $\alpha_2 > \alpha_1$.

2. A method according to claim 1, wherein said structure on the substrate is rotated during said first and second ion beam etchings.

3. A method according to claim 1, wherein the etched first insulating and conductive layers have a trapezoidal cross-section having an oblique side which is covered by said second insulating layer.

4. A method of fabricating a thin-film magnetic head comprising the steps of:
   forming a laminate of a lower magnetic layer, first insulating layer and first conductive layer on a substrate;
   forming a first coil patterned mask on said first conductive layer of the laminate;
   applying a first ion beam onto a structure formed by the first two steps to simultaneously etch said first insulating layer and said first conductive layer;
   successively forming a second insulating layer and a second conductive layer over said etched structure;
   forming a second coil patterned mask on said second conductive layer, the second coil patterned mask being aligned with said first coil patterned mask;
   applying a second ion beam onto a structure formed by the above steps to simultaneously etch said second insulating layer and said second conductive layer; and
   successively forming a third insulating layer and an upper magnetic layer so that a magnetic gap between said lower and upper magnetic layers is defined by the thickness of said third insulating layer; wherein said first and second ion beams are respectively applied at respective incident angles of $\alpha_1$, and $\alpha_2$, where $\alpha_2 > \alpha_1$.

5. A method according to claim 4, wherein the first double-layer has a trapezoidal cross-section having an oblique side which is covered by said third insulating layer.

6. A method according to claim 4, wherein the second double-layer has a trapezoidal cross-section.

* * * * *